United States Patent
Frerichs et al.

(10) Patent No.: US 7,276,231 B2
(45) Date of Patent: Oct. 2, 2007

(54) LOWER-ENERGY PROCESS FOR PREPARING PASSIVATED INORGANIC NANOPARTICLES

(75) Inventors: Scott Rickbeil Frerichs, Hockessin, DE (US); William Harvey Morrison, Jr., Wilmington, DE (US); Douglas Eric Spahr, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/135,584

(22) Filed: May 23, 2005

(65) Prior Publication Data

US 2006/0264552 A1   Nov. 23, 2006

(51) Int. Cl.
  *B05D 7/00*   (2006.01)
(52) U.S. Cl. .................. 424/59; 523/212; 523/216; 524/497; 428/530
(58) Field of Classification Search .............. 424/59; 428/530; 523/212, 216; 524/497
  See application file for complete search history.

(56) References Cited

U.S. PATENT DOCUMENTS

| | | | |
|---|---|---|---|
| 4,416,699 A * | 11/1983 | Jacobson | 106/443 |
| 4,460,655 A * | 7/1984 | Jacobson | 428/530 |
| 5,415,936 A | 5/1995 | Deusser et al. | |
| 5,451,390 A | 9/1995 | Hartmann et al. | |
| 5,607,994 A | 3/1997 | Tooley et al. | |
| 5,631,310 A | 5/1997 | Tooley et al. | |
| 5,672,330 A | 9/1997 | Hartmann et al. | |
| 5,698,177 A | 12/1997 | Pratsinis et al. | |
| 5,762,914 A | 6/1998 | Hartmann et al. | |
| 5,889,090 A | 3/1999 | Tooley et al. | |
| 5,959,004 A | 9/1999 | Tooley et al. | |
| 6,022,404 A | 2/2000 | Ettlinger et al. | |
| 6,193,795 B1 | 2/2001 | Nargiello et al. | |
| 6,429,237 B1 * | 8/2002 | Tooley | 523/216 |
| 6,620,234 B1 * | 9/2003 | Kostelnik et al. | 106/445 |
| 6,894,089 B2 * | 5/2005 | Mei et al. | 523/212 |
| 2002/0155059 A1 | 10/2002 | Boulos et al. | |
| 2005/0013599 A1 | 1/2005 | Nakanishi et al. | |
| 2005/0069706 A1 | 3/2005 | Kessell | |
| 2005/0129634 A1 * | 6/2005 | Frerichs et al. | 424/59 |

FOREIGN PATENT DOCUMENTS

| | | |
|---|---|---|
| DE | 870 242 | 3/1953 |
| EP | 129959 A1 * | 1/1985 |
| EP | 0 244 180 A1 | 11/1987 |
| EP | 0393857 | 10/1990 |
| EP | 1544256 A2 * | 6/2005 |
| WO | WO95/23193 A1 | 8/1995 |

OTHER PUBLICATIONS

European Search Report Dated Sep. 11, 2006, European Application No. 06009814.2-2111.
U.S. Appl. No. 60/434,158, filed Dec. 17, 2002, Stephen C. De La Veaux et al.
Souris E. Pratsinis. Wenhua Zhu, Srinivas Vemury "The role of gas mixing in flame synthesis of titania powders" Powder Technology, 86 (1996) 87-93.
Ullmann's Encyclopedia of Technical Chemistry, 4th newly revised and expanded edition, vol. 21, pp. 464-467(1982).

* cited by examiner

*Primary Examiner*—Henry S. Hu

(57) ABSTRACT

The disclosure is directed to a method for reducing the chemical activity and photo activity of titanium dioxide nanoparticles comprising adding an amorphous alumina-stabilizing agent, specifically an anion, such as citric acid, to an aqueous slurry of the titanium dioxide nanoparticles; treating the aqueous slurry with a source of alumina, such as a solution of sodium aluminate, to form alumina-treated titanium dioxide nanoparticles; recovering the alumina-treated inorganic nanoparticles, wherein the nanoparticles have a particle size of about 50 to about 300 nm; and milling the nanoparticles to form nanoparticles having a particle size about 15% smaller than silica-treated inorganic nanoparticles milled under similar conditions. The titanium dioxide nanoparticles described herein are useful in cosmetic, coating and thermoplastic compositions.

20 Claims, No Drawings

LOWER-ENERGY PROCESS FOR PREPARING PASSIVATED INORGANIC NANOPARTICLES

FIELD OF THE DISCLOSURE

The present disclosure relates to a process for preparing inorganic nanoparticle compositions. More specifically, the disclosure relates to an improved process that requires less energy for preparing nanoparticles that have been alumina treated.

BACKGROUND OF THE DISCLOSURE

The scientific and technological advantages of nanostructured particles and materials have been attracting considerable attention. The small size of nanoparticles (generally used to indicate particles less than 100 nm in diameter), which can be responsible for different useful properties (electronic, optical, electrical, magnetic, chemical, and mechanical), makes them suitable for a wide variety of industrial applications.

Titanium dioxide ($TiO_2$) nanoparticles are substantially transparent to visible light but can absorb and scatter ultraviolet light. Titanium dioxide has low toxicity and is non-irritating to the skin. $TiO_2$ nanoparticles are especially advantageous when added to products in which transparency to visible light is important but exposure to the degrading and harmful effects of ultraviolet light is a problem. Such applications include, without limit, cosmetics, sunscreens, protective coatings, such as clear coatings for exterior wood and automobiles, and plastics.

Manufacture of nanoparticulate $TiO_2$ has been reported throughout the literature. Sulfate-route or liquid phase precipitation routes typically involve nanoparticulate $TiO_2$ particle growth steps, followed by aggregation, from calcinination or other high temperature treatment, with subsequent milling to reduce and/or control finished product particle size at the optimum required for performance. A high temperature plasma oxidation of titanium tetrachloride ($TiCl_4$) process in which nanoparticulate $TiO_2$ is manufactured directly under suitable reactor design and operating conditions has been described. As these processes require high energy costs, alternative means of manufacture would be desirable.

Titanium dioxide itself is known to be photoactive. Free radicals form on the surface of the titanium dioxide particle under the action of ultraviolet rays. While the photoactivity of titanium dioxide is beneficial for use of titanium dioxide in photo catalyzed reactions, in other uses the free radicals can lead to degradation reactions and yellowing which can be disadvantageous. Such other uses include, without limit, cosmetics, sunscreens and plastics, wood and automotive coatings, etc. Thus, there is a desire for techniques that can photo-passivate the titanium dioxide; that is, render the titanium dioxide more photostable.

Untreated titanium dioxide pigments and nanoparticles are known to be chemically reactive. Untreated titanium dioxide will form highly colored complexes with certain antioxidants, such as ascorbic acid and ascorbic acid 6-palmitate. These colored complexes limit the use of titanium dioxide nanoparticles in applications where white creams and lotions are desired, such as cosmetics and sunscreens. Effective methods for passivation of the chemical reactivity of titanium dioxide pigments and nanoparticles are therefore desired.

Treatments to passivate $TiO_2$ will typically cause agglomeration of primary particles. Although steps can be taken to reduce this agglomeration, there is, typically, required a downstream grinding or milling step to reduce particle agglomeration to the range necessary for optimum performance. Treatment techniques that increase agglomeration can necessitate more intensive grinding or milling steps that add significantly to the energy costs of nanoparticulate $TiO_2$ manufacture. Thus, there is a need for techniques that can make titanium dioxide nanoparticles nonreactive to such antioxidants and that have the required particle size without the need for long milling times that would add to the cost of manufacturing these nanoparticles.

SUMMARY OF THE DISCLOSURE

The present disclosure provides a process for making alumina-treated inorganic nanoparticles, comprising:
 (a) forming a slurry of inorganic nanoparticles;
 (b) contacting the slurry of inorganic nanoparticles with an amorphous alumina-stabilizing agent;
 (c) contacting the slurry with a source of alumina to form alumina-treated inorganic nanoparticles;
 (d) recovering the alumina-treated inorganic nanoparticles, wherein the nanoparticles have a median particle size ranging from about 50 to about 300 nm; and
 (e) milling the nanoparticles recovered in step (d) to form nanoparticles having a particle size about 15% smaller than inorganic nanoparticles comprising a silica treatment milled under similar conditions.

In the first aspect, the inorganic nanoparticle is selected from metal oxide, mixed metal oxides, metal hydroxide, metal sulfide, metal carbonate, metal sulfate, silica, and mixtures thereof, wherein the metal is selected from Ca, Mg, Ti, Ba, Zn, Zr, Mo, Ce, and Al.

This process has been found to produce inorganic nanoparticles, particularly titanium dioxide nanoparticles, which are passivated as indicated by a high photo-chemical stability and high chemical stability. In addition the nanoparticles have a reduced tendency to form agglomerates and can be milled to the required particle size with significantly less energy and without loss of performance.

The inorganic nanoparticles of this disclosure can be used in sunscreen formulations and in thermoplastic compositions.

DETAILED DESCRIPTION OF THE DISCLOSURE

In the process of this disclosure, at least one source of alumina can be added to a slurry of inorganic nanoparticles, water and an amorphous alumina-stabilizing agent to form the treated titanium dioxide nanoparticles.

The alumina-treated nanoparticles of this disclosure are free of treatment of a slurry of the nanoparticles with a source of silica; however, this disclosure does not exclude a nanoparticle starting material that contains silica, such as silica which can be incorporated during production of the inorganic starting material, nor does it exclude a nanoparticle product in which silica has been added after milling such as by silanizing the milled product. Contacting a nanoparticle-containing aqueous slurry with a source of silica, such as sodium silicate, to treat the nanoparticles prior to milling is to be avoided.

The present disclosure further provides inorganic nanoparticles, that are treated, typically surface treated, with amorphous alumina in the presence of an amorphous alumina-stabilizing agent, more specifically, an anion source.

The inorganic nanoparticle is selected from metal oxide, mixed metal oxides, metal hydroxide, metal sulfide, metal carbonate, metal sulfate, silica, and mixtures thereof, wherein the metal is selected from Ca, Mg, Ti, Ba, Zn, Zr, Mo, Ce, and Al.

In one embodiment of this disclosure, a slurry of titanium dioxide nanoparticles is heated and source of the anion is added to the slurry. The slurry is an aqueous mixture of the titanium dioxide particles, which are water insoluble. The suspension slurry is pH adjusted and then treated with a source of alumina, typically sodium aluminate at a controlled pH. After treatment with the source of alumina, the slurry is held at a certain pH and elevated temperature for a period of time sufficient to cure the particles. An objective of the curing step is to deposit alumina onto the particles, more typically, by substantially coating the particles with a layer of amorphous alumina.

In one embodiment of the disclosure the initial temperature of the slurry is optimally greater than about 30° C., typically greater than about 40° C., even more typically greater than about 50° C., Temperatures can range from about 30 to about 80° C., more typically in the range of about 40° C. to about 70° C. and still more typically from about 50° to about 60° C., although lower temperatures might also be effective. In one embodiment of the disclosure the initial temperature of the slurry is optimally greater than about 40° C., typically above about 50° C., more typically in the range of about 50° to about 60° C., although lower temperatures might also be effective. The amount of the alumina is optimally in the range of between about 5 and about 15% as $Al_2O_3$ based on weight of untreated $TiO_2$.

A strong mineral acid can be employed during the alumina treatment. Any strong mineral acid, including but not limited to HCl, $HNO_3$, and $H_2SO_4$ could be used. The optimal acid addition time for a pilot scale batch process ranges from 0.5 to about 5.0 minutes per 1% $Al_2O_3$ added (up to 30 minutes per 1% $Al_2O_3$ or large plant scale batches). Longer times can lead to better product but at the expense of rate.

After adding the alumina, the pH of the slurry is typically held at a neutral level, usually at (7.0)+/−0.5, more typically (6.0)+/−0.5. Higher values might lead to undesired alumina phases, particularly for semi-crystalline alumina. Lower values may lead to incomplete alumina deposition.

The alumina treated slurry is then held for a period of time sufficient to deposit alumina onto the titanium dioxide particles typically by forming a coating of alumina on the titanium dioxide particles. The holding time is typically 3 minutes per 1% alumina for small lab scale batches (up to 20 minutes per 1% alumina for large plant batches). Shorter times can be used but the treatment may not be as effective. This holding step is typically carried out while maintaining a near-neutral pH and elevated temperature. Thus the pH usually is maintained at (7.0)+/−0.5, more typically (6.0)+/−0.5.

Particulate compositions of the present disclosure generally include from about 3 to about 20%, more typically from about 5 to about 15% amorphous alumina based on the weight of the untreated $TiO_2$.

The alumina treated titanium dioxide nanoparticles, usually, are then filtered, washed, milled, and dried. The recovered particles are in a size range of about 50 to about 300 nm determined by techniques well known in the art such as scanning electron micrograph.

The treatment occurs in the presence of an amorphous alumina-stabilizing agent. Typically, the amorphous alumina-stabilizing agent comprises an anion. The anion is important for creating disorder and stabilizing the amorphous phase of the alumina. Suitable sources of anions include a source for citrate ion such as citric acid, a source of phosphate ion such as phosphoric acid, a source of sulfate ion such as sodium sulfate, and a source of fluoride ion such as sodium fluoride or potassium fluoride. Citric acid is the typical source of the anion because of its dispersion enhancing properties. A useful amount of the agent is an amount sufficient to adequately stabilize the amorphous phase of the alumina coating. An excess of the agent may lead to waste of the agent. Suitable amounts of the agent can be in the range of about 0.5% to about 3.0%, more typically from about 0.8% to about 2.4% based on weight of untreated $TiO_2$.

The concentration of $TiO_2$ in the slurry may range from about 50 g/l to about 500 g/l, more typically from about 125 to 250 grams per liter, although lower levels are also possible. Good coating consistency has been found with a relatively low concentration slurry. The temperature of the slurry usually ranges from about 30 to about 80, typically about 40 to about 70, more typically about 50 to about 60° C., although lower or higher temperatures may also be effective.

A strong alkaline base, such as sodium hydroxide, may be used to neutralize the slurry, if needed, prior to alumina treatment.

In the alumina treatment the initial temperature of the slurry is optimally greater than about 30° C., typically above about 40° C., more typically in the range of about 50° C. to about 60° C., although lowers temperatures might also be effective. Lower temperatures can be used to reduce energy costs of heating the slurry. The added alumina amount is optimally in the range of between about 5 and about 15% as $Al_2O_3$ based on weight of untreated $TiO_2$.

Any strong mineral acid can be employed during this alumina treatment including HCl, $HNO_3$, and $H_2SO_4$. The optimal acid addition time for a pilot scale batch process ranges from 0.5 to about 5.0 minutes per 1% $Al_2O_3$ added (up to 30 minutes per 1% $Al_2O_3$ for large plant scale batches). Longer times can lead to better product at the expense of rate.

After adding the alumina, the pH of the slurry is typically held at a neutral level, usually at 7.0+/−0.5, more typically at 6.0+/−0.5. Higher values might lead to undesired alumina phase; lower values to incomplete alumina deposition.

The alumina treated slurry is then held for a period of time sufficient to form a coating of alumina on the titanium dioxide particles. The holding time is typically 3 minutes per 1% alumina for pilot scale batches (up to 20 minutes per 1% alumina for large plant batches). Shorter times can be used but the coating may not be as effective. This holding step is typically carried out while maintaining a near-neutral pH and elevated temperature. Thus the pH usually is maintained at 6.0+/−0.5. The temperature is usually maintained above about 50° C., typically at about 55° C. to about 60° C.

Alumina treated particulate compositions of the present disclosure generally can include from about 3 to about 20%, more typically from about 5 to about 15% amorphous alumina based on the weight of the untreated $TiO_2$.

The alumina treated titanium dioxide nanoparticles may have a median particle size in diameter between about 50 to about 300 nanometers, more typically about 60 nanometers to about 180 nanometers. These particles are then milled to improve the particle size distribution. It has been found that using the same energy to mill the alumina-treated titanium dioxide particles gives more desirable particle size than corresponding silica- or silica-alumina-treated nanoparticles. The alumina-treated titanium dioxide nanoparticles have a median particle size up to about 15% smaller, more typically about 10% smaller, than silica or silica-alumina-treated inorganic nanoparticles milled under similar conditions. The coarse tail of the particle size distribution measured at %>220 nm for alumina-treated nanoparticles is typically less than 5%, while that for silica- or silica-alumina-treated nanoparticles is typically greater than 10% and often more than 15%. Importantly, passivation test results for the two treated titanium dioxide particles indicate the alumina-treated product has comparable, if not improved, performance over the silica- or silica-alumina-treated product.

Milling may be accomplished with a micronizer, ball mill, microfluidizer, media mill, or another type of grinding or milling equipment. The alumina treated titanium dioxide nanoparticles are milled for a sufficient time and with sufficient energy to obtain the particle size distribution required to meet performance goals. Longer milling times are required with silica- or silica-alumina-treated nanoparticles compared to the alumina-treated nanoparticles. Typically, a media mill with zirconium silicate beads in the size range of 0.4 mm would require 3 passes at a low feed rate to obtain the desired particle size distribution.

The alumina treated titanium dioxide nanoparticles may then be dried. The final particles are in a size range significantly less than pigmentary $TiO_2$; typically the average particle size in diameter is between about 60 and about 160 nanometers, more typically in the range of 100 to 140 nanometers.

Any titanium dioxide nanoparticles may be suitable in this disclosure. Some suitable titanium dioxide nanoparticles are described in U.S. Pat. Nos. 5,451,390; 5,672,330; and 5,762,914. One commercially available titanium dioxide nanoparticle product is P25 sold by Degussa of Germany. Other commercial sources of titanium dioxide nanoparticles include M262 sold by Kemira of Finland, RM-130F sold by Sachtleben of Germany and MT-500 sold by Tayca of Japan.

The primary titanium dioxide nanoparticles typically have an average particle size diameter of less than 100 nanometers (nm) as determined by dynamic light scattering that measures the particle size distribution of particles in liquid suspension. The particles are typically agglomerates that may range from about 3 nm to about 6000 nm.

Many processes are known in the art of nanoparticle manufacture that can be used to prepare titanium dioxide nanoparticles. The process may involve vapor phase oxidation of titanium halides or solution precipitation from soluble titanium complexes, provided that titanium dioxide nanoparticles are produced.

A typical process to prepare titanium dioxide nanoparticles is by injecting oxygen and titanium halide, preferably titanium tetrachloride, into a high-temperature reaction zone, typically ranging from 400 to 2000 degrees centigrade. Under the high temperature conditions present in the reaction zone, nanoparticles of titanium dioxide are formed having high surface area and a narrow size distribution. The energy source in the reactor may be any heating source such as a plasma torch.

Aerosol processes may be carried out by many different methods. Turbulent and laminar flow aerosol reactors have been described for the generation of titanium dioxide nanoparticles. In addition, many solution-based methods, with and without templating techniques, have been described.

The vast majority of these various processes produce an anatase titanium dioxide as the principal product, with a few providing a mixture of the anatase and rutile polymorphs as a principal product. Very few of these methods produce rutile as the predominant or singular product. Rutile is preferable for many applications in which photochemistry is not a desirable element of performance.

Nanotitania absorbs and scatters ultraviolet light very efficiently, with said efficiency differing as a function of the particle size distribution and phase chemistry of the particular titanium dioxide involved. The difference in band gap between anatase and rutile results in a shift in the onset of ultraviolet light absorption from ca. 380 nm for rutile to ca. 360 nm for anatase. The higher refractive index of rutile versus that of anatase also leads to higher scattering at larger wavelengths for the former. The relatively small size of nanotitanium dioxide leads to a substantial diminution in scattering in the visible region. This is a very useful property in a number of applications, including but not limited to the protection of films from degradation by ultraviolet light, the preparation of translucent articles with improved mechanical performance as a function of ultraviolet light fluence, and the generation of nanocomposite materials with enhanced resistance to degradation by ultraviolet light.

A preferred process to prepare titanium dioxide nanoparticle starting material is by injecting oxygen and titanium halide, preferably titanium tetrachloride, into a high-temperature reaction zone, typically ranging from 400 to 2000 degrees centigrade. Under the high temperature conditions present in the reaction zone, nanoparticles of titanium dioxide are formed having high surface area and a narrow size distribution. The energy source in the reactor may be any heating source such as a plasma torch. Optionally, the reactor may also include a flow homogenizer that ensures that feeds from the reactant inlets enter the reactor chamber downstream of the recirculation zone induced by the high temperature gas discharge. A flow homogenizer is described in U.S. Provisional Patent Application No. 60/434158 filed on Dec. 17, 2002 that is incorporated herein by reference in its entirety.

The titanium dioxide starting material may be substantially pure titanium dioxide or may contain other inorganic material such as metal oxides. Examples include one or more of silica, alumina, zirconia and magnesia which can be incorporated into the particle using techniques known by those skilled in the art, for example these metal oxides can be incorporated when the titanium compounds are co-oxidized or co-precipitated with other metal oxide compounds. If such co-metals are present, they are preferably present in an amount of about 0.1 to about 5% based on the total metal oxide weight. The titanium dioxide starting material may also have one or more such metal oxide coatings applied using techniques known by those skilled in the art prior to treatment in accordance with this disclosure. In one embodiment of the disclosure, a slurry of substantially pure titanium dioxide is "pretreated" with alumina prior to contacting the slurry with the stabilizing agent. The pretreatment is typically to an amount of about 1 to about 4% based on the total metal oxide weight.

Typically, for alumina pretreated titanium dioxide, the final alumina level of products made by the disclosure is about 2.5% higher if the $TiO_2$ is pretreated with alumina.

Benefits have been found when the titanium dioxide nanoparticle starting material contains alumina, in a coating or by incorporation into the particle. Alumina in the starting material may provide a better coating, resulting in improved passivation. In addition, it has been found that the chemical reactivity (determined by the Vitamin C Yellowing Test which is described below) may be lower.

The titanium dioxide products can also have an organic coating that may be applied using techniques known by those skilled in the art. A wide variety of organic coatings are known. Organic coatings employed for pigment-sized titanium dioxide may be utilized to coat nanoparticles. Examples of organic coatings that are well known to those skilled in the art include fatty acids, such as stearic acid; fatty acid esters; fatty alcohols, such as stearyl alcohol; polyols such as trimethylpropane diol or trimethyl pentane diol; acrylic monomers, oligomers and polymers; and silicones, such as polydimethylsiloxane and reactive silicones such as methylhydroxysiloxane.

Organic coating agents can include but are not limited to carboxylic acids such as adipic acid, terephthalic acid, lauric acid, myristic acid, palmitic acid, stearic acid, oleic acid, salicylic acid, malic acid, maleic acid, and esters, fatty acid esters, fatty alcohols, such as stearyl alcohol, or salts thereof, polyols such as trimethylpropane diol or trimethyl pentane diol; acrylic monomers, oligomers and polymers. In addition, silicon-containing compounds are also of utility. Examples of silicon compounds include but are not limited to a silicate or organic silane or siloxane including silicate, organoalkoxysilane, aminosilane, epoxysilane, and mercaptosilane such as hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, N-(2-aminoethyl) 3-aminopropylmethyl dimethoxysilane, N-(2-aminoethyl) 3-aminopropyl trimethoxysilane, 3-aminopropyl triethoxysilane, 3-glycidoxypropyl trimethoxysilane, 3-glycidoxypropyl methyldimethoxysilane, 3-mercaptopropyl trimethoxysilane and combinations of two or more thereof. Polydimethylsiloxane and reactive silicones such as methylhydroxysiloxane may also be useful.

The particles may also be coated with a silane having the formula:

$$R_xSi(R')_{4-x}$$

wherein

R is a nonhydrolyzable aliphatic, cycloaliphatic or aromatic group having at least 1 to about 20 carbon atoms;

R' is a hydrolyzable group such as an alkoxy, halogen, acetoxy or hydroxy or mixtures thereof; and x=1 to 3.

For example, silanes useful in carrying out the disclosure include hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Additional examples of silanes include, R=8-18 carbon atoms; R'=chloro, methoxy, hydroxy or mixtures thereof; and x=1 to 3. Preferred silanes are R=8-18 carbon atoms; R'=ethoxy; and x=1 to 3. Mixtures of silanes are contemplated equivalents. The weight content of the treating agent, based on total treated particles can range from about 0.1 to about 10 wt. %, additionally about 0.7 to about 7.0 wt. % and additionally from about 0.5 to about 5 wt %.

The titanium dioxide particles of this disclosure can be silanized as described in U.S. Pat. Nos. 5,889,090; 5,607,994; 5,631,310; and 5,959,004 which are each incorporated by reference herein in their entireties.

The titanium dioxide starting material and/or the final alumina treated titanium dioxide particles of this disclosure may be treated to have any one or more of the foregoing organic coatings.

Titanium dioxide nanoparticles made according to the present disclosure may be used with advantage in various applications including sunscreens and cosmetic formulations; coatings formulations including automotive coatings, wood coatings, and surface coatings; chemical mechanical planarization products; catalyst products; photovoltaic cells; plastic parts, films, and resin systems including agricultural films, food packaging films, molded automotive plastic parts, and engineering polymer resins; rubber based products including silicone rubbers; textile fibers, woven and nonwoven applications including polyamide, polyaramid, and polyimides fibers products and nonwoven sheets products; ceramics; glass products including architectural glass, automotive safety glass, and industrial glass; electronic components; and other uses in which photo and chemically passivated titanium dioxide nanoparticles will be useful.

In one embodiment, the disclosure herein can be construed as excluding any element or process step that does not materially affect the basic and novel characteristics of the composition or process. Additionally, the disclosure can be construed as excluding any element or process step not specified herein.

TEST METHODS

Vitamin C Yellowing Test For Chemical Stability:

A standard solution of 6.25% ascorbic acid palmitate (L-ascorbic acid 6-palmitate, 99%, CAS #137-66-6, available commercially from Alfa Aesar) in octyl palmitate (hexadecanoic acid 2-ethylhexyl ester, CAS #29806-73-3, available under the name "Ceraphyl" by VanDyk) is prepared. Using a spatula and glass plate or Hoover Muller Model M5, 1.9+0.05 ml of the solution was thoroughly mixed with 0.4+0.01 g sample of titanium dioxide to be tested. The mixture was drawn down onto a white lacquered 3"×5" (7.62×12.7 cm) card using a 6 mil (15.24 µm) Bird film applicator to form the test film. The color (L*a*b*) of the test film was measured using a hand-held spectrocolorimeter, such as Byk-Gardner Model CB-6805 which was warmed-up prior to taking the color reading, calibrated and set up to use D65/10 degree (illuminant/observer). In the same manner as the test film, a blank film was prepared using neat octyl palmitate and ultrafine titanium dioxide. The color of the blank film was measured in the same way as the color of the test film. The delta b* value was determined by comparing the color of the test and blank films. The delta b* value was a measure of chemical activity.

Nujol Yellowing Photo-Chemical Activity Test:

A mixture of 100.0+/−0.25 grams of dry, moisture free, Mineral Oil and 2.00+/−0.01 grams of butylated hydroxy toluene (BHT), and 2.00+/−0.01 grams of Tinuvin® 770 (Ciba-Geigy Corp). is prepared and allowed to stir at ambient temperature. Petrolatum (10.0+/−0.1 g) is added to the mixture with stirring until completely dissolved.

A pipette is used to transfer 1.20+/−0.05 mL of the mixture prepared above onto a Muller apparatus (Hoover Corp, Model M-5) and 0.64+/−0.01 g ultrafine titanium dioxide were mixed in with a spatula. The mixture was mulled for 20 revolutions, drawn together with a spatula, and then mulled for another 20 revolutions. The mixture was then gathered with a spatula drawn down onto a microscope slide using a 10 mil Bird film applicator. A spectrocolorimeter (such as Labscan Model LS-5100 or LS-6000), warmed up for at least one hour, calibrated and set up to use D65/10 degree (illuminant/observer), was used to measure the L*a*b* of the film. The slide was placed into a light booth with 6 black-light-blue (BLB) UV Lamps at a distance of approximately 60 cm. The slide was exposed to the UV light for a total exposure time of 24 hours.

After exposure, the spectrocolorimeter was used to measure the L*a*b* of the exposed film. The change in b* (delta b*) upon exposure is calculated as the difference between the final and initial b*, and used as a measure of the photo-chemical activity of the titanium dioxide powder.

Particle Size Distribution

The Malvern ZetaSizer Nano-System was used to measure the median volume particle diameter size distribution of the samples. This system uses the principle of dynamic light scattering to measure the particle size distribution of particles in liquid suspension. The measured size range was 0.006 μm to 6 μm (6 nm to 6000 nm). The refractive index used for TiO2 in setting up the analysis was 2.55. The dry particle sample was prepared into a liquid dispersion to carry out the measurement. An example procedure is as follows:

(1) Weigh out 0.08 g dry powder into a jacketed beaker.
(2) Add 79.9 2 g 0.1% tetra sodium pyrophosphate (TSPP) solution in water to make a 0.1 wt. % suspension.
(3) Sonicate the suspension for 10 minutes using an ultrasonic probe. The suspension should be cooled with water flow from a tap through the jacketed beaker during sonication.
(4) When sonication is complete, draw an aliquot for analysis. Note: hydrophobic particles must first be wetted with a few drops of sodium dioctyl sulfosuccinate before adding into solution of TSPP.

X-Ray Fluorescence Spectroscopy:

Oxide content of titanium dioxide powder samples was measured using an x-ray wavelength spectrometer with flow and scintillation detectors, such as Philips Model PW-1400, PW-1404, PW-1480, or PW-1420/AXS. Appropriate calibration standards were employed to establish calibration curves for measurement of unknown samples.

EXAMPLES

Comparative Example 1

Approximately 8000 mls of deionized water were added to 1000 g of nanometric titanium dioxide made by RF plasma oxidation according to US 2002/0155059A1 in a 12 liter stainless steel beaker and the mixture was stirred. The mixture was screened through a 325 mesh sieve. The screened mixture was added to a 12 liter stainless steel beaker equipped with an electric stirrer, temperature probe and pH probe. The mixture was rapidly stirred using a propeller blade.

The initial pH was 1.0. The mixture was heated to 60° C. and the pH was adjusted to 7.0 with 50% NaOH solution (141.5 g). Then 204.0 g sodium aluminate (23.5 wt. % alumina) was added. The pH was 11.3. The mixture was stirred for 15 minutes.

The mixture was heated to 90° C. Then, 60.0 g of 50% citric acid solution were added. The pH after citric acid addition was 9.8. The pH was adjusted to 10.7 with 65.3 g of 50% NaOH solution. Then, 484.0 g of sodium silicate (27 wt. % silica) were added with strong stirring. The pH was 11.1. Over about 30 minutes concentrated (38%) hydrochloric acid was added to reduce the pH to 6.6 (223.9 g.HCl).

The mixture was stirred for 45 minutes at 90-95° C. The heat was stopped. Then concentrated HCl (301.8 g) and sodium aluminate (412.0 g) were added simultaneously over the course of about 5 minutes, maintaining pH in the range of 6-8. The mixture was stirred for 20 minutes while maintaining a pH of 7.0+/−0.2. At the end of 20 minutes the temperature was 71° C. The pH was adjusted to 6.2 with 19.4 g of concentrated HCl. The mixture was stirred again for 5 minutes). The final mixture was filtered, washed with DI polished water to <143 mhos/cm conductance (~60 liters water, 134 micro mhos/cm). The mixture was vacuum filtered for about 30 minutes to form a wet cake. The bulk of the wet cake was then transferred into a plastic bag and processed as described below. A small sample of the cake was dried in 125° C. convection oven overnight on a tray. The dry particles were ground through a 35 mesh sieve and dried again.

Measured $SiO_2$: 8.32%
Measured $Al_2O_3$: 10.11%

The wet cake was liquified by simple mixing and pH was adjusted to 10.3 by addition of 50.0 g 2-amino-2-methyl-1-propanol. The mixture was treated with 100.0 g octyl triethoxysilane. The slurry was spray dried in a 0.42 cubic meter. Niro spray dryer. Dried product was collected in a bag filter as a fine, free-flowing white powder. Results are shown in Table 1 below.

Example 1

Approximately 8000 mls of deionized water were added to 1000 g of nanometric titanium dioxide made by RF plasma oxidation according to US 2002/0155059A1 in a 12 liter stainless steel beaker and the mixture was stirred. The mixture was screened through a 325 mesh sieve. The screened mixture was added to a 12 liter stainless steel beaker equipped with an electric stirrer, temperature probe and pH probe. The mixture was rapidly stirred using a propeller blade.

The initial pH was 1.1. Before heating, 80.0 g of 50% citric acid solution were added and the pH after citric acid addition was 0.9. The mixture was heated to 54° C. and the pH was adjusted to 6.0 with 50% NaGH solution (156.7 g). Then 240.0 g of sodium aluminate (23.5 wt. % alumina) were added slowly. The pH was 11.2. The mixture was stirred for 15 minutes at about 50° C. Then 40.0 g of potassium fluoride were added and the pH was 11.3. The mixture was stirred for 15 minutes and the temperature was 51° C. Then concentrated sulfuric acid (390.7 g) and sodium aluminate (720.0 g) were added simultaneously over the course of about 20 minutes, maintaining pH in the range of 6.0+/−0.2. The mixture was stirred for 60 minutes while maintaining a pH of 6.0+/−0.2 and temperature of 60+/−5 degrees C. At the end of 60 minutes, the temperature was 61° C. and the pH was 6.1. The final mixture was filtered, washed with deionized water to <143 mhos/cm conductance (~68 liters water, 114 micro mhos/cm). The mixture was vacuum filtered for about 30 minutes to form a wet cake. The bulk of the wet cake was then transferred into a plastic bag and processed as described below. A small sample of the cake was dried in 125° C. convection oven overnight on a tray. The dry particles were ground through a 35 mesh sieve and dried again.

Measured $SiO_2$: 0.0%
Measured $Al_2O_3$: 16.2%

The wet cake was liquified by simple mixing and pH was adjusted to 10.3 by addition of 300.0 g 2-amino-2-methyl-1-propanol. The mixture was treated with 100.0 g octyl triethoxysilane. The slurry was spray dried in a 0.42 cubic meter Niro spray dryer. Dried product was collected in a bag filter as a fine, free-flowing white powder. Results are shown in Table 1 below.

Comparative Example 2

Titanium tetrachloride was pre-mixed with aluminum trichloride (chloride mix) and fed to the oxidation reactor. The amount of aluminum trichloride was sufficient to provide about 1.5% aluminum oxide based on total solids formed in the oxidation reactor.

The chloride mix was evaporated and pre-heated to about 450° C. and introduced into the reaction zone. Simultaneous with the introduction of the chloride mix, pre-heated oxygen (where the total excess oxygen was about 50 mole %) was continually introduced through a separate inlet adjacent to the chloride mix inlet. Trace amounts of CsCl dissolved in water was added to the oxygen stream. Reaction temperature where the chloride mix contacted the oxygen was about 1550° C. The powder produced was separated from the gases in a cyclone separator and baghouse collection operation. The ultrafine titanium dioxide cyclone discharge was transported into a tank where it was mixed in water at about 15% solids, collected, and neutralized with sodium hydroxide.

Approximately 4000 grams of deionized water were added to 4000 g of ultrafine titanium dioxide cyclone discharge slurry in a 12 liter stainless steel beaker and the mixture was stirred with an electric mixer using a propeller blade. The % solids of the mixture was determined to be 15.3% by weight and the total amount of titanium dioxide base was calculated to be 1191 grams. The beaker was equipped with a temperature probe and pH probe.

The initial pH was 4.7. A solution of 50% citric acid (19.0 g) was added and the pH after citric acid addition was 2.1. The mixture was heated to 90° C., and the pH was adjusted to 10.7 with 119.0 g of 50% NaQH solution. Then, 463.9 g sodium silicate (27 wt. % silica) were added with strong stirring. The pH was 10.5. Over about 60 minutes, 18% hydrochloric acid solution (HCl) was added to reduce the pH to 6.8 (246.0 g.HCl solution). The mixture was stirred for 45 minutes at 90-95° C. The heat was stopped. Then, 18% HCl solution (282.5 g) and sodium aluminate (245.3.0 g) were added simultaneously over the course of about 5 minutes, maintaining pH in the range of 6-8. The mixture was stirred for 20 minutes while maintaining a pH of 7.0+/−0.2. At the end of 20 minutes the temperature was 72° C. The pH was adjusted to 6.0 with 10.3 g of 18% HCl solution. The mixture was stirred for an additional 15 minutes. The final mixture was filtered, washed with deionized water to <143 mhos/cm conductance (~34 liters water, 74 micro mhos/cm). The mixture was vacuum filtered for about 30 minutes to form a wet cake. The bulk of the wet cake was then transferred into a plastic bag and processed as described below. A small sample of the cake was dried in 125° C. convection oven overnight on a tray. The dry particles were ground through a 35 mesh sieve and dried again.

Measured $SiO_2$: 7.0%
Measured $Al_2O_3$: 5.1%

The wet cake was liquified by simple mixing prior to media milling. Media milling was performed in a 0.6 liter Netzsch mill, equipped with a ceramic chamber, 0.3 mm YTZ beads, and a 100 micron laser-cut retaining screen. The batch was milled at 2500 rpm for 1 hour in recirculation mode.

The milled slurry was mixed with 57.0 g of 70 wt. % trimethylolpropane and then spray dried in a 15 cu.ft. Niro spray dryer. Dried product was collected in a bag filter as a fine, free-flowing white powder.

The product was micronized in an 20 cm micronizer (fluid energy mill) apparatus, equipped with a primary collection outlet directly below the mill and a secondary product collection cyclone. Steam pressures were about 5:4 kg/cm$^2$ at the jet ring with total steam flow of 68 kg/hr. Primary and secondary collection points were combined for finished product testing. Results are shown in Table 1 below.

Example 2

Approximately 4000 grams of deionized water were added to 4000 g of ultrafine titanium dioxide cyclone discharge slurry made as described in comparative Example 2. The % solids of the mixture was determined to be 14.4% by weight and the total amount of titanium dioxide base was calculated to be 1135 grams. The beaker was equipped with a temperature probe and pH probe.

The initial pH was 6.1. A solution of 50% citric acid (0.11 g) was added and the mixture was heated to 46° C. The pH after heating was 6.1. Then 19.3 grams of potassium fluoride was added. The mixture was stirred for 15 minutes and the pH was 10.8.

The pH was adjusted with concentrated $H_2SO_4$ (20.2 g) to 5.9. Then concentrated sulfuric acid (121.5 g) and sodium aluminate (197.5 g) were added simultaneously over the course of about 5 minutes, maintaining pH in the range of 6.0+/−0.2. The mixture was stirred for 60 minutes while maintaining a pH of 6.0+/−0.2 and temperature of 50+/−5° C. At the end of 60 minutes the temperature was 49° C. and the pH was 6.1. The final mixture was filtered, washed with DI polished water to <143 mhos/cm conductance (~33 liters water, 123 micro mhos/cm). The mixture was vacuum filtered for about 30 minutes to form a wet cake. The bulk of the wet cake was then transferred into a plastic bag and processed as described below. A small sample of the cake was dried in 125° C. convection oven overnight on a tray. The dry particles were ground through a 35 mesh sieve and dried again.

Measured $SiO_2$: 0.0%
Measured $Al_2O_3$: 5.1%

The wet cake was liquified by simple mixing prior to media milling with the addition of 700 grams deionized water. Media milling was performed in a 0.6 liter Netzsch mill, equipped with a ceramic chamber, 0.3 mm YTZ beads, and a 100 micron laser-cut retaining screen. The batch was milled at 2500 rpm for 1 hour in recirculation mode.

The milled slurry was mixed with 57.0 g of 70 wt. % trimethylolpropane and then spray dried in a 15 cu.ft. Niro spray dryer. Dried product was collected in a bag filter as a fine, free-flowing white powder.

The product was micronized in a 20 cm micronizer (fluid energy mill) apparatus, equipped with a primary collection outlet directly below the mill and a secondary product collection cyclone. Steam pressures were about 5:4 kg/cm$^2$ at the jet: ring with total steam flow of 68 kg/hr. Primary and secondary collection points were combined for finished product testing. Results are shown in Table 1 below.

Comparative Example 3

Approximately 76.4 kgs of deionized water were added to 56.2 kg of ultrafine titanium dioxide cyclone discharge slurry made as described in Comparative Example 2 with the following exception: a 200 liter stainless steel tank was used. The % solids of the mixture was determined to be 7.7% by weight and the total amount of titanium dioxide base was calculated to be 10.2 kgs. The beaker was equipped with a temperature probe and pH probe.

The initial pH was 8.0. A solution of 50% citric acid (244.4 g) was added and the pH after citric acid addition was 3.5. The mixture was heated to 90° C. and the pH was adjusted to 10.5 with 236.3 g of 50% NaOH solution. Then 3351.0 g sodium silicate (approx. 18 wt. % silica) was added with strong stirring. The pH was 10.6. Over about 30 minutes concentrated HCl was added to reduce the pH to 6.5 (1199.0 g.HCl solution). The mixture was stirred for 45 minutes at 90-95° C. The heat was stopped. Then concentrated HCl solution (1802.9 g) and sodium aluminate (2862.0 g) were added simultaneously over the course of about 5 minutes, maintaining pH in the range of 6-8. The mixture was stirred for 20 minutes while maintaining a pH of 7.0+/−0.2. At the end of 20 minutes the temperature was 82° C. The pH was adjusted to 6.0 with 44.2 g of concentrated HCl. The mixture was stirred for an additional 15 minutes. The final mixture was filtered, washed with DI polished water to <143 mhos/cm conductance (118 micro mhos/cm). The mixture was vacuum filtered for about 30 minutes to form a wet cake. The bulk of the wet cake was then transferred into a plastic bag and processed as described below. A small sample of the cake was dried in 125° C. convection oven overnight on a tray. The dry particles were ground through a 35 mesh sieve and dried again.

Measured $SiO_2$: 6.19%
Measured $Al_2O_3$: 5.58%

A 2500 g sample of the wet cake was liquified by simple mixing and the pH was adjusted to 9.8 with 17.0 grams 2-amino-2-methyl-1-propanol. The mixture was treated with 25.0 grams octyl triethoxysilane. Media milling was then performed in a 0.6 liter Netzsch mill, equipped with a ceramic chamber, 0.2 mm YTZ beads, and a 100 micron laser-cut retaining screen. The batch was milled at 2500 rpm for 8 hour in recirculation mode.

The milled slurry was dried in an oven at 125° C. overnight. The powder was ground through a 35 mesh sieve and then dried at 125° C. for an additional 2 hours.

The dry product was micronized in an 20 cm micronizer (fluid energy mill) apparatus, equipped with a primary collection outlet directly below the mill and a secondary product collection cyclone. Steam pressures were about 5:4 kg/cm$^2$ at the jet:ring with total steam flow of 68 kg/hr. Primary and secondary collection points were combined for finished product testing. Results are shown in Table 1 below.

Example 3

Approximately 3600 grams of deionized water were added to 5000 g of ultrafine titanium dioxide cyclone discharge slurry made as described in comparative Example 2 in a 12 liter stainless steel beaker and the mixture was stirred with an electric mixer using a propeller blade. The % solids of the mixture was determined to be 13.2% by weight and the total amount of titanium dioxide base was calculated to be 1124 grams. The beaker was equipped with a temperature probe and pH probe.

The initial pH was 11.4. A solution of 50% citric acid (0.10 g) was added and the pH after citric acid addition was 11.4. The mixture was heated to 48° C. and adjusted to pH 6.1 with 8.7 grams of concentrated $H_2SO_4$. The 16.5 grams of potassium fluoride was added and the pH was measured at 8.3. The mixture was stirred for 15 minutes and the pH was 8.7.

The pH was adjusted with concentrated $H_2SO_4$ (8.7 g) to 6.1. Then concentrated sulfuric acid (75.8 g) and sodium aluminate (127.7 g) were added simultaneously over the course of about 5 minutes, maintaining pH in the range of 6.0+/−0.2. The mixture was stirred for 60 minutes while maintaining a pH of 6.0+/−0.2 and temperature of 50+/−5° C. At the end of 60 minutes the temperature was 51° C. and the pH was 6.1. The final mixture was filtered, washed with deionized water to <143 mhos/cm conductance (~34 liters water, 73 micro mhos/cm). The mixture was vacuum filtered for about 30 minutes to form a wet cake. The bulk of the wet cake was then transferred into a plastic bag and processed as described below. A small sample of the cake was dried in 125° C. convection oven overnight on a tray. The dry particles were ground through a 35 mesh sieve and dried again.

Measured $SiO_2$: 0.0%
Measured $Al_2O_3$: 3.2%

The wet cake was liquified by simple mixing prior to media milling with the addition of 700 grams deionized water. Media milling was performed in a 0.6 liter Netzsch mill, equipped with a ceramic chamber, 0.2 mm YTZ beads, and a 100 micron laser-cut retaining screen. The batch was milled at 2500 rpm for 8 hours in recirculation mode.

The milled slurry was dried in an oven at 125° C. overnight. The powder was sieved at 35 mesh and then dried at 125° C. for an additional 2 hours. The dry powder was then mixed with 57.0 g of 70 wt. % trimethylolpropane by spraying the solution with an atomizer onto the powder. After spraying, the powder was collected as a fine, free-flowing white powder.

The product was micronized in a 20 cm micronizer (fluid energy mill) apparatus, equipped with a primary collection outlet directly below the mill and a secondary product collection cyclone. Steam pressures were about 5:4 kg/cm$^2$ at the jet:ring with total steam flow of 68 kg/hr. Primary and secondary collection points were combined for finished product testing. Results are shown in Table 1 below.

TABLE 1

| Sample | % SiO2 | % Al2O3 | % C | m2/g | VitC delta b* | Nujol delta b* | d50 nm | % >220 nm |
|---|---|---|---|---|---|---|---|---|
| Comparative Example 1 | 8.8 | 10.16 | 3.08 | 113.6 | 7 | na | 96.1 | 16.8 |
| Example 1 | 0.00 | 16.16 | 6.08 | 139.0 | 5.6 | na | 94.4 | 3.4 |
| Comparative Example 3 | 8.81 | 8.24 | 2.61 | 68.0 | 8.9 | 2.0 | 139.0 | 22.2 |
| Example 3 | 0.00 | 3.37 | 1.49 | 43.0 | 3.5 | 1.2 | 127.0 | 3.0 |
| Comparative Example 2 | 7.88 | 5.82 | 1.22 | 40.2 | 0.2 | 3.1 | 151.0 | 13.2 |
| Example 2 | 0.00 | 5.52 | 0.86 | 21.1 | 0.0 | 0.9 | 137.0 | 5.0 |

As shown in Table 1, product treated with silica has been found to have a substantially increased level of agglomeration of the particles compared to the alumina-treated product. From the particle size distribution data, including both primary particles and agglomerates, for the product of Example 1, 3.4% of the particles were larger than 220 nm in diameter compared to 16.8% for the product of Comparative Example 1. Similarly, in Examples 2 and 3, the particle size distribution data show that a smaller percentage of the particles were greater than 220 nm as compared to the product of Comparative Examples 2 and 3. Thus, with the same amount of grinding energy applied to the particles after the treatment process, the silica-treated product had a substantially greater coarse tail than the alumina-treated product. It is also reasonably expected that less energy is needed to obtain a desirable particle size distribution required for improved product performance properties with alumina-treatments compared to silica-treatments.

As further shown in Table 1, the vitamin C test for chemical stability showed that the product of Examples 1, 2 and 3 were more chemically stable than the product of the Comparative Examples.

Passivation test results, following the Nujol photostability test, were also carried out. The passivation tests indicated that the alumina-treated product of the Examples have comparable photostability performance compared to the silica-treated product of the Comparative Examples.

The description of illustrative and preferred embodiments of the present disclosure is not intended to limit the scope of the disclosure. Various modifications, alternative constructions and equivalents may be employed without departing from the true spirit and scope of the appended claims.

What is claimed is:

1. A process for making alumina-treated inorganic nanoparticles comprising:
   (a) forming a slurry of inorganic nanoparticles by mixing the nanoparticles with water;
   (b) contacting the slurry of inorganic nanoparticles with an amorphous alumina-stabilizing agent;
   (c) contacting the slurry with a source of alumina to form alumina-treated inorganic nanoparticles;
   (d) recovering the alumina-treated inorganic nanoparticles by filtering the slurry to form a wet cake;
   (e) liquefying the wet cake and media milling the liquefied wet cake to form a milled slurry;
   (f) drying the milled slurry to form a powder; and
   (g) micronizing the powder to form alumina-treated inorganic nanoparticles in which 5% or less of the particles, based on the volume particle size distribution within a range of 6 nm to 6000 nm, have a diameter greater than 220 nm.

2. The process of claim 1 wherein the inorganic nanoparticle is selected from the group consisting of metal oxide, mixed metal oxides, metal hydroxide, metal sulfide, metal carbonate, metal sulfate, silica, and mixtures thereof.

3. The process of claim 2 wherein the metal is selected from the group consisting of Ca, Mg, Ti, Ba, Zn, Zr, Mo, Ce, and Al.

4. The process of claim 2 wherein the inorganic nanoparticle comprises titanium dioxide.

5. The process of claim 1 wherein the amorphous alumina-stabilizing agent has an anion.

6. The process of claim 5 wherein the anion is selected from the group consisting of citrate ions, phosphate ions, sulfate ions, and fluoride ions.

7. The process of claim 1 further comprising contacting the slurry of inorganic nanoparticles with sodium aluminate prior to step (b).

8. The process of claim 1 wherein the source of alumina is sodium aluminate.

9. The process of claim 1 further comprising contacting the treated inorganic nanoparticle with an organic composition.

10. The process of claim 1 wherein the treated inorganic nanoparticles are silanized.

11. The process of claim 10 wherein the organic composition comprises at least one of octyltriethoxysilane, aminopropyltriethoxysilane, polyhydroxystearic acid, and polyhydroxy siloxide.

12. The process of claim 5 wherein the source of the anion comprises citric acid.

13. The process of claim 5 wherein the source of the anion comprises phosphoric acid.

14. The process of claim 5 wherein the source of the anion comprises sodium sulfate.

15. The process of claim 5 wherein the source of the anion comprises potassium fluoride.

16. The process of claim 1 wherein less than 5% of the alumina-treated inorganic nanoparticles formed in step (g), based on the volume particle size distribution within a range of from 6 nm to 6000 nm, have a diameter greater than 220 nm.

17. The process of claim 1 further comprising dispersing the inorganic nanoparticles in an organic or aqueous medium.

18. The process of claim 1 further comprising the step of dispersing the inorganic nanoparticles in a thermoplastic material.

19. The process of claim 1 in which the step of micronizing is carried out in a 20 cm micronizer apparatus.

20. The process of claim 1 in which the liquefied wet cake is media milled in a Netzch mill.

* * * * *